United States Patent
Stumfall et al.

[11] Patent Number: 6,160,591
[45] Date of Patent: Dec. 12, 2000

[54] APPARATUS AND METHOD OF PROVIDING SWITCHING FREQUENCY SYNCHRONIZATION

[75] Inventors: David M. Stumfall, Santa Ana; Kazutoyo Sekine, Irvine, both of Calif.

[73] Assignees: Sony Corporation, Tokyo, Japan; Sony Trans Com Inc., Irvine, Calif.

[21] Appl. No.: 08/934,316

[22] Filed: Sep. 19, 1997

[51] Int. Cl.[7] .................................................. H04N 5/21
[52] U.S. Cl. .......................................... 348/607; 348/730
[58] Field of Search ..................................... 348/607, 522, 348/524, 730, 6, 8; H04N 5/21

[56] References Cited

U.S. PATENT DOCUMENTS 5,389,968  2/1995  Koyanagi ...................................... 348/6

*Primary Examiner*—Sherrie Hsia
*Attorney, Agent, or Firm*—Blakely, Sokoloff, Taylor & Zafman LLP

[57] ABSTRACT

An apparatus and method for reducing interference on a display screen in an in-flight entertainment system, where the interference results from power conversion by a power regulator that supplies voltage to the display screen, is disclosed. The apparatus comprises a clock generator that provides a video clock signal and a regulator clock signal having a frequency that is a multiple of a frequency of the video clock signal. The apparatus also comprises a video processing circuit coupled to the clock generator that provides video data to the display screen at a rate derived from the video clock signal. A regulator circuit that is coupled to the video processing circuit and to the clock generator, supplies voltage to the video processing circuit at a rate based on the regulator clock signal.

20 Claims, 5 Drawing Sheets

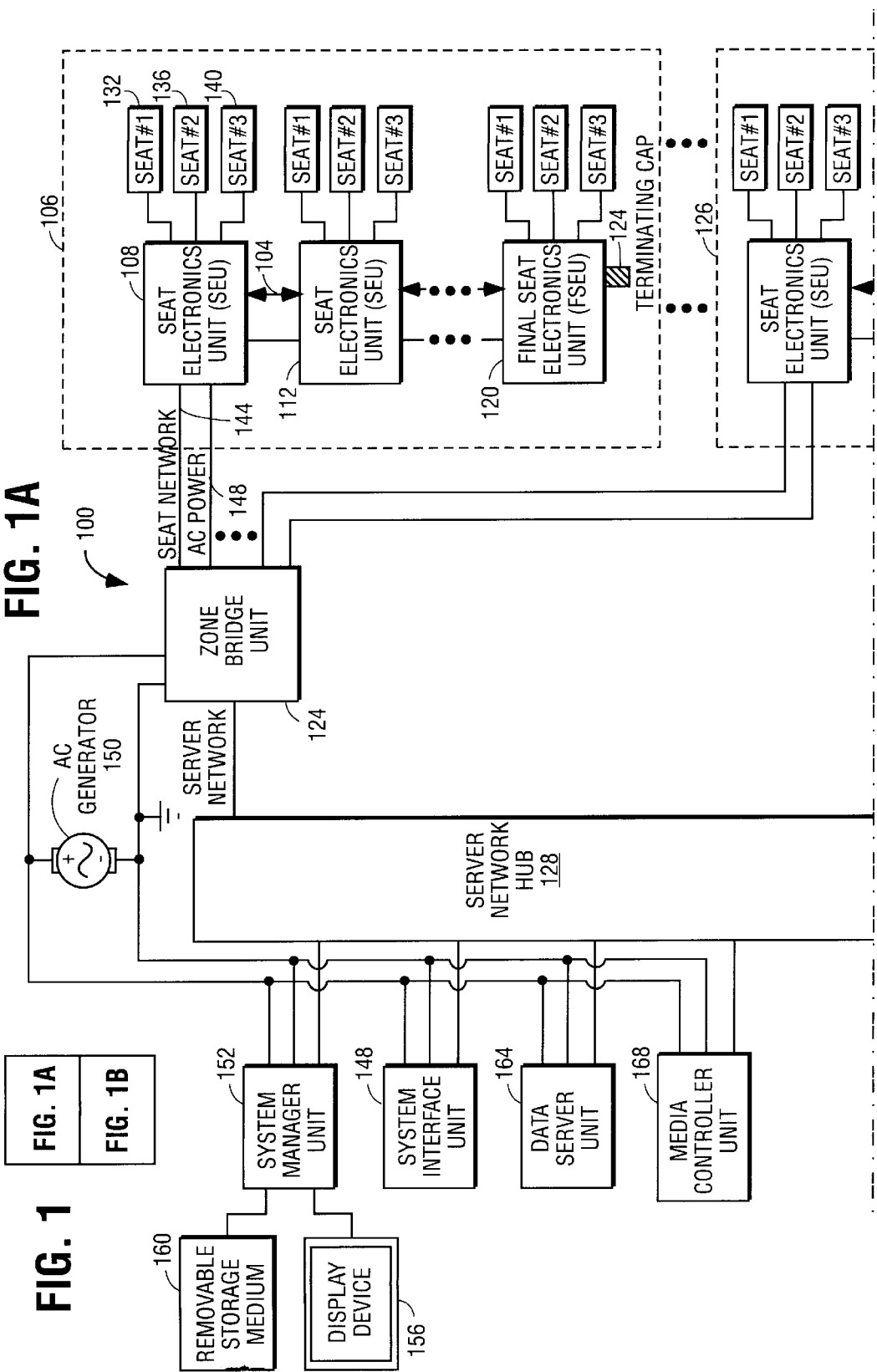

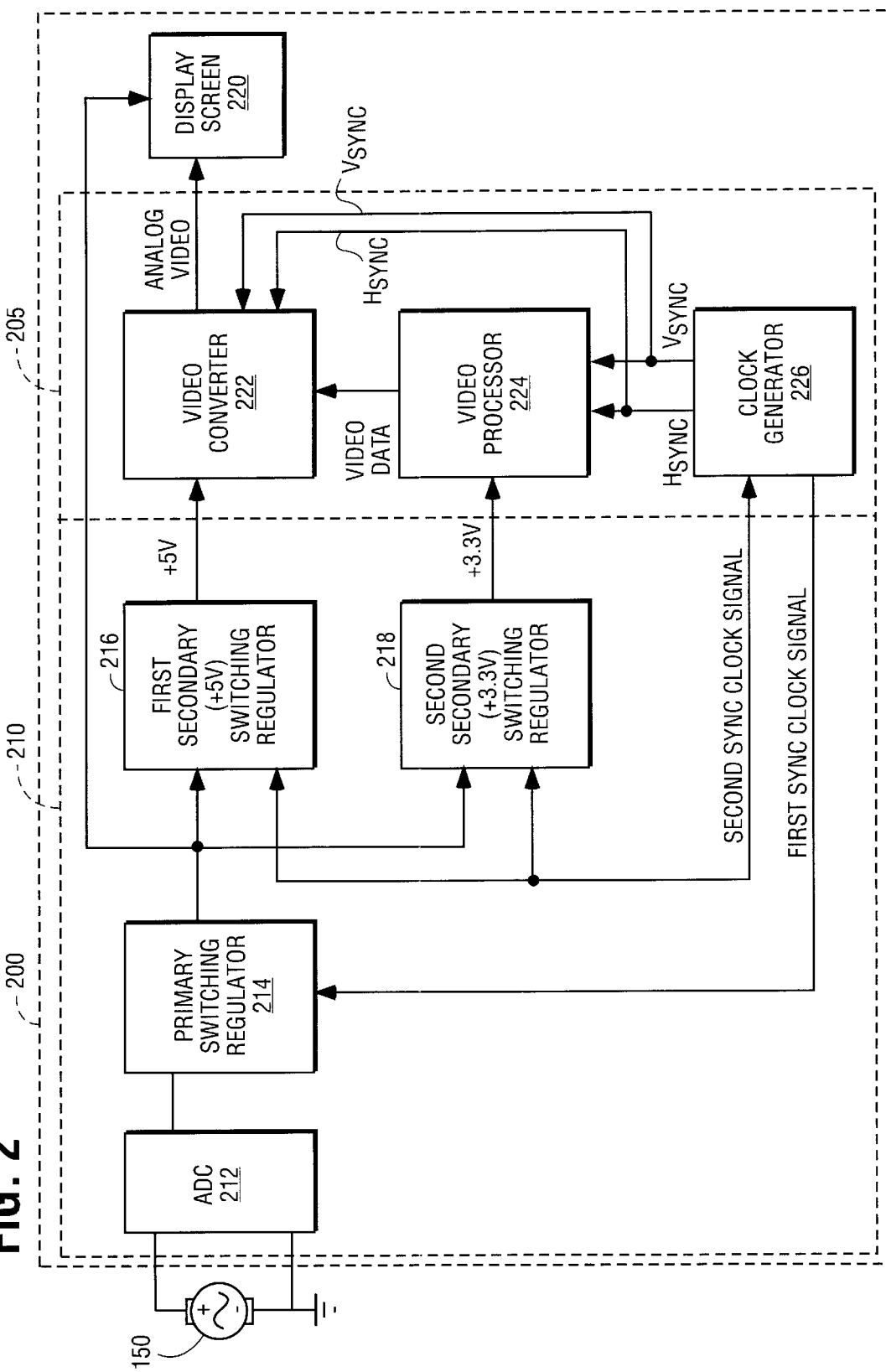

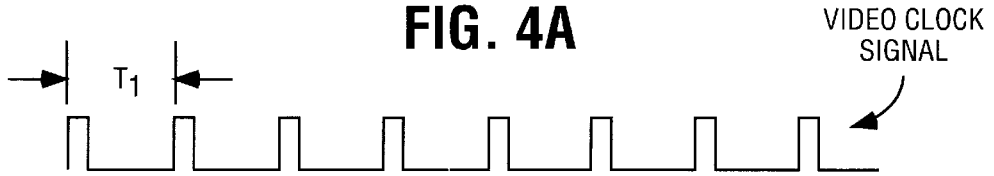
FIG. 4A — VIDEO CLOCK SIGNAL
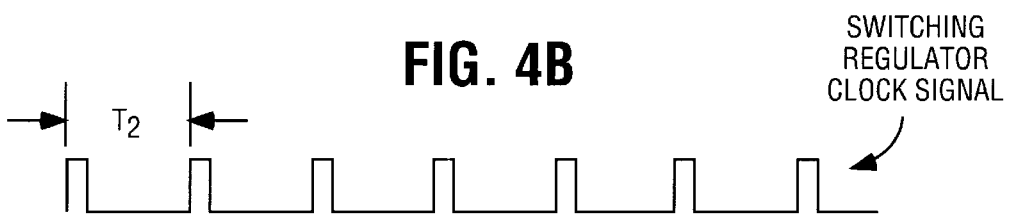
FIG. 4B — SWITCHING REGULATOR CLOCK SIGNAL
FIG. 4C — INTERFERENCE SIGNAL (DYNAMIC)
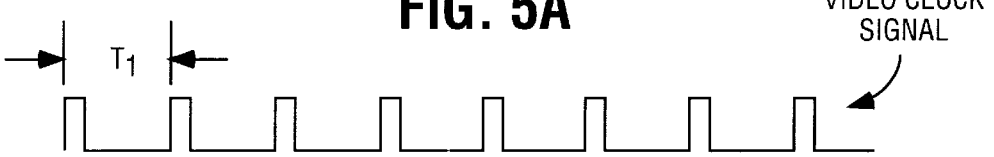
FIG. 5A — VIDEO CLOCK SIGNAL
FIG. 5B — SWITCHING REGULATOR CLOCK SIGNAL
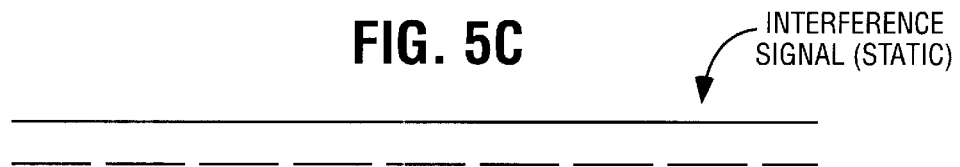
FIG. 5C — INTERFERENCE SIGNAL (STATIC)

APPARATUS AND METHOD OF PROVIDING SWITCHING FREQUENCY SYNCHRONIZATION

BACKGROUND OF THE INVENTION

1. Field of the Invention

The present invention relates to power supplies. More particularly, the present invention relates to a method and apparatus of providing switching frequency synchronization for power supply regulators.

2. Description of the Related Art

Over the past few decades, commercial aircraft has become a necessary mode of travel for personal and business reasons. To improve passenger comfort, commercial aircraft typically offer a number of entertainment activities that can be enjoyed by the passenger, such as video games, movies and various selections of music. In addition, various electronic systems for supporting communications and/or other in-flight functions are provided.

Such electronic systems typically comprise seat electronic units which receive in-flight entertainment programs from a central system and which subsequently deliver these programs to one or more passengers on the aircraft. These electronic units typically include circuitry which draw power from power supplies implementing power regulators which convert power from a 12V power source to a +5V and/or a +3.3V power source. Various electronic units, including display screens, obtain supply current and voltage from such power sources and regulators. The switching frequency associated with such power conversion typically generate high frequency noise and electric or magnetic field distortion. Various peripheral units, such as display screens, are particularly sensitive to such noise or interference. In the case of display screens, such interference results in the display of video images of reduced quality.

Accordingly, there is a need in the technology for an apparatus and method that minimizes high frequency noise and electric or magnetic field distortion resulting from the switching frequency generated by power supply regulators.

BRIEF SUMMARY OF THE INVENTION

An apparatus and method for reducing interference on a display screen in an in-flight entertainment system, where the interference results from power conversion by a power regulator that supplies voltage to the display screen, is disclosed. The apparatus comprises a clock generator that provides a video clock signal and a regulator clock signal having a frequency that is a multiple of a frequency of the video clock signal. The apparatus also comprises a video processing circuit coupled to the clock generator that provides video data to the display screen at a rate derived from the video clock signal. A regulator circuit that is coupled to the video processing circuit and to the clock generator, supplies voltage to the video processing circuit at a rate based on the regulator clock signal.

BRIEF DESCRIPTION OF THE DRAWINGS

FIGS. 1, 1A and 1B together show an overall schematic view of a flight entertainment system 100 which implements the switching frequency synchronization system of the present invention.

FIG. 2 is a detailed block diagram of a portion of an electronic system 200 which implements the switching synchronization system 205 of the present invention.

FIGS. 4A and 4B are timing diagrams illustrating the timing cycles of a video clock signal and a switching regulator clock signal respectively.

FIG. 4C illustrates an interference signal that is dynamic relative to a video clock signal when the timing cycles of the video clock signal and the switching regulator clock signal are not synchronized.

FIGS. 5A and 5B are timing diagrams illustrating the timing cycles of a video clock signal and a switching regulator clock signal respectively.

FIG. 5C illustrates an interference signal that is stationary relative to a video clock signal when the timing cycles of the video clock signal and the switching regulator clock signal are synchronized.

DETAILED DESCRIPTION OF THE INVENTION

Figure 1B:
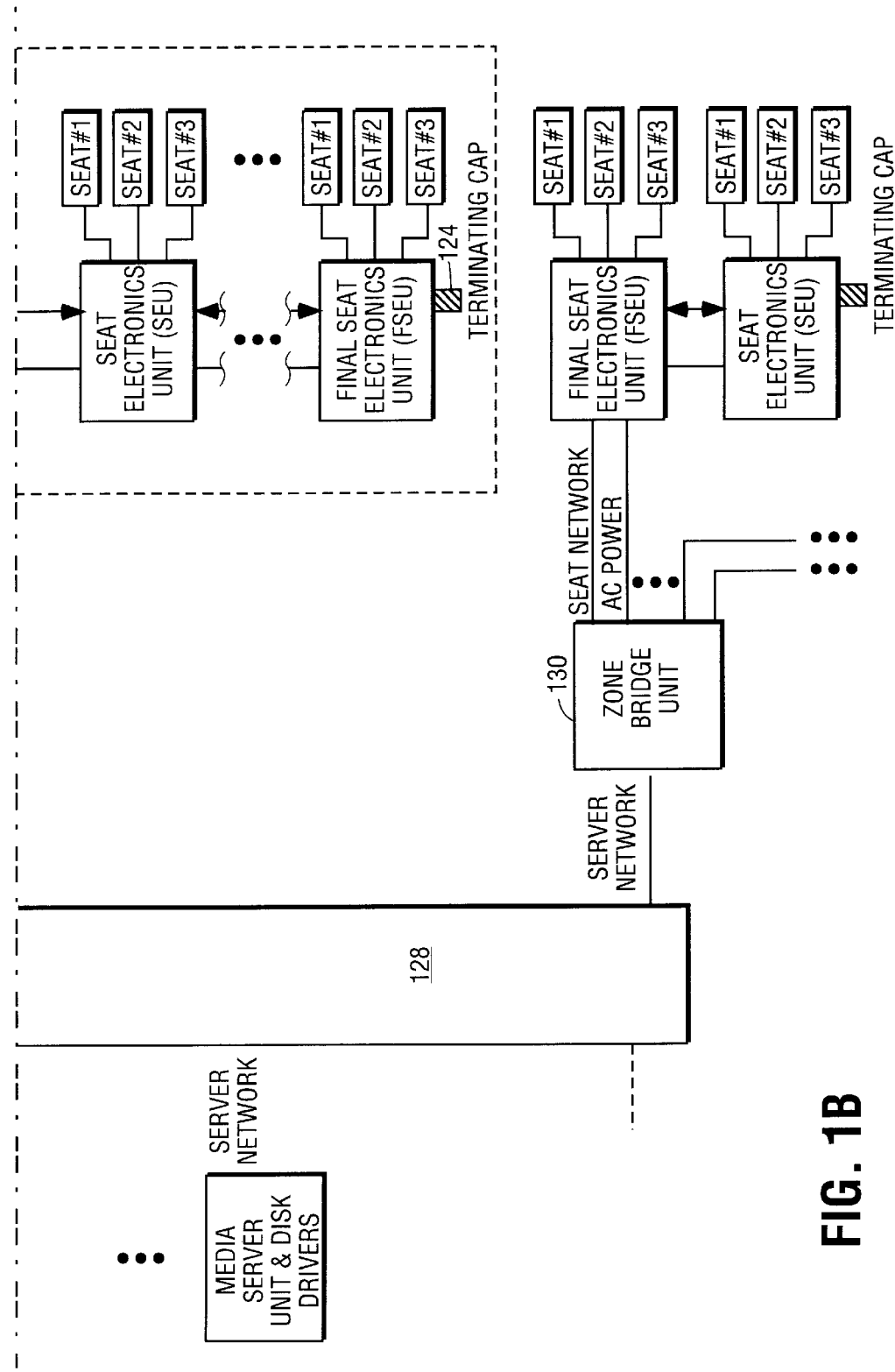

FIGS. 1, 1A and 1B together show an overall schematic view of a flight entertainment system 100 which implements the switching frequency synchronization system of the present invention. The flight entertainment system 100 includes an interconnect bus 104, a daisy chain 106 of interconnecting seat electronic units (SEUs) 108, 112, 120 and a terminating cap 124. Each daisy chain 106 is connected such that the output of one SEU is connected to the input of the next SEU until the final seat electronics unit (FSEU) 120 is reached. The SEUs receive the audio and video signals from a Zone Bridge Unit (ZBU) 114. Each ZBU 114 supports multiple daisy chains 106, 126. A Server Network Hub 128 coordinates and communicates the information to and from multiple ZBUs 114, 130 to supporting electronics.

Each SEU, e.g. SEU 108, provides the necessary audio and video signals to support a number of passenger seats 132, 136, 140 in the passenger compartment of an aircraft. In one embodiment, an SEU may support two to three passenger seats depending on the aircraft configuration used. In the described embodiment, up to 12 SEUs are daisy chained together although the number of SEUs in a daisy chain may vary.

Each ZBU 114 services one section or zone of an aircraft. A ZBU 114 may service multiple daisy chains 106, 126. In one design, daisy chain 106, 126 may serve an aisle of a plane while each ZBU 114 serves a plane section. The bus which forms each daisy chain 106, is terminated at the FSEU 120. The FSEU includes terminating cap 124 which terminates interconnect bus 104.

ZBU 114 distributes audio and video data on a seat network bus 144 and power along AC power line 148 to the various SEUs 108, 112. In one embodiment, power is provided by an AC generator 150 located on the aircraft. The system may also receive data, such as credit card information, entertainment requests, or merchandise orders, from seat electronics (not shown) in the vicinity of passenger seat 132, 136, 140. The respective SEU unit 108 receives the data and may then transfer the data to the respective ZBU 124 via seat network bus 144. This information may be further transmitted through the server network hub 128 to other electronics aboard the aircraft, or in the case of telephone or other communication to a public switched telephone network ("PSTN") or other external networks outside of the aircraft through a system interface unit 158. A system manager unit (SMU) 152 oversees operation of the IFE. The SMU 152 is coupled to a display device 156 which displays passenger requests and system status information. A floppy drive 160 is also provided for storing data.

The IFE, including the SMU 152 and the SEUs 108, 112, 120 is designed to perform self diagnostic checks. In particular, the SEUs perform diagnostic checks and may forward error messages to the SMU. The SMU 152 then displays the error on display device 156 or the information is stored on a floppy disk or other removable storage medium 160 for further use or analysis. This information enables technicians or maintenance personnel to quickly troubleshoot the IFE system. A server network hub 128 may further be coupled to other units which provide information such as Data Server Units (DSUs) 164 and Media Controller Units (MCUs) 168 which provide the video/audio contact.

In a preferred embodiment, the switching frequency synchronization system of the present invention may be used in conjunction with power supplies which provide supply current and voltage to electronic systems which provide in-flight entertainment services such as those shown in FIGS. 1A and 1B. These electronic systems include, but are not limited to, SEUs 108, 112, 120 and System Manager Unit 152. For discussion purposes, any one of the electronic systems shall be referred to as the electronic system 200.

FIG. 2 is a detailed block diagram of a portion of an electronic system 200 which implements the switching synchronization system 205 of the present invention. The electronic system 200 receives its current and voltage supply from a power supply 210, which in turn obtains supply current and voltage from the AC generator 150. The received current is converted to DC by a primary AC-to-DC converter (ADC) 212 located within the power supply 210. The converted DC is provided to a primary DC regulator 214, which provides a +12V DC supply to a first secondary switching regulator 216, a second secondary switching regulator 218 and a display screen 220. It is understood that one or more display screens may be implemented. For present purposes, only one display screen 220 will be referred to. In a preferred embodiment, the display screen 220 is a liquid crystal display (LCD) screen. In one embodiment, the first secondary switching regulator 216 provides an output voltage of +5 V, while the second secondary switching regulator 218 provides an output voltage of +3.3 V. The primary switching regulator 214, the first secondary switching regulator 216 and the second secondary switching regulator 218 are all located within the power supply 210.

The first secondary power supply 216 provides supply current and voltage to a video converter driver 222 located in the electronic system 200, while the second secondary switching regulator 218 provides supply current and voltage to a video processor 224. The video processor 224 provides video data to the video converter 222, which in turn provides analog video data to the display screen 220 for display. A clock generator 226 provides a first clock signal to the primary switching regulator 214 and a second clock signal to the first and second secondary switching regulators 216 and 218. The clock generator 226 also provides both a horizontal (H sync) signal and a vertical (V sync) clock signal to the video processor 224 and the video converter 222.

Figure 3:
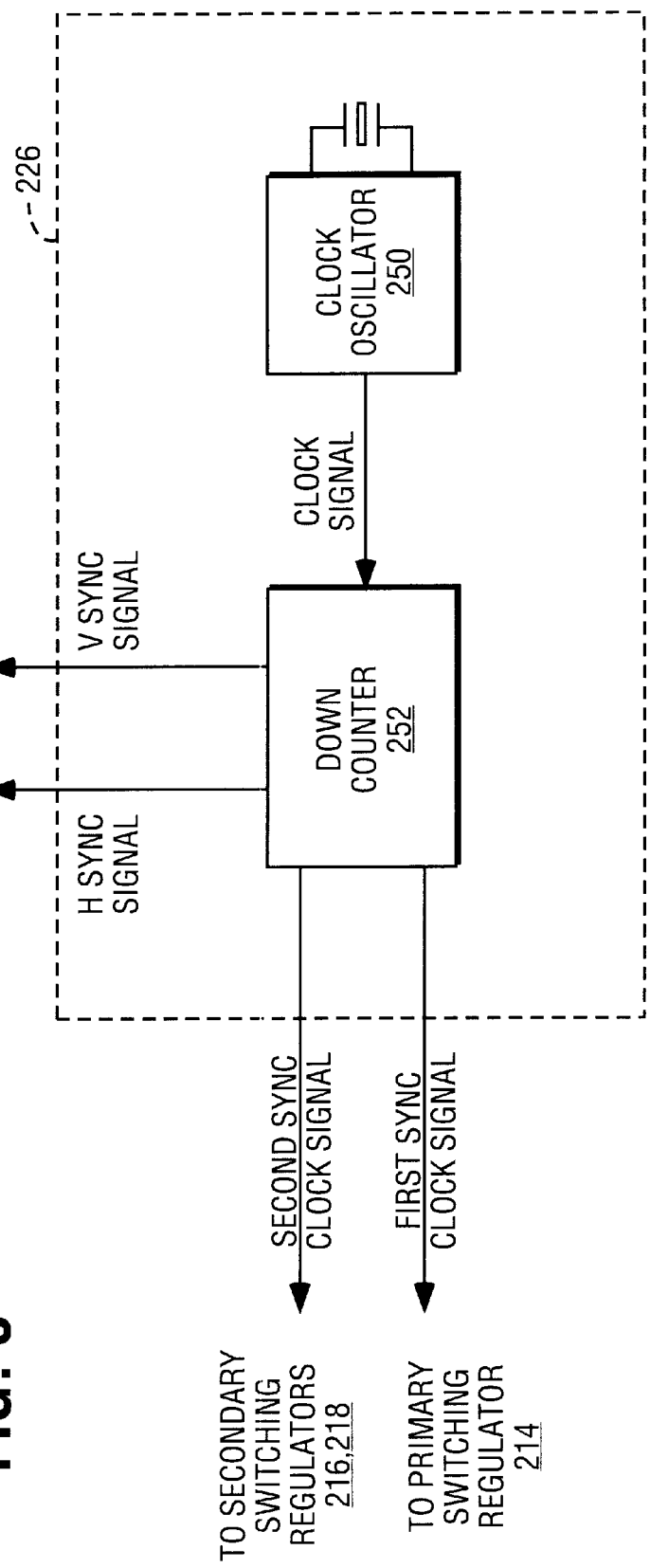
FIG. 3 is a detailed block diagram of the clock generator 226 of FIG. 2.

The present invention provides synchronization of the first and the second clock signals with the H sync clock signal so that the switching noise resulting from power conversion in the switching regulators 214, 216 and 218 will not degrade the video image quality on the display screen 220. FIG. 3 is a detailed block diagram of the clock generator 226. The clock generator 226 comprises a clock oscillator 250 which provides a clock signal to a down counter 252. In a preferred embodiment, the clock signal has a frequency of 66.7 MHz. The down counter 252 provides a horizontal synchronized (H sync) signal and a vertical synchronized (V sync) signal to the video processor 224 and the video converter 222 (see FIG. 2). In one embodiment, the frequency of the H sync signal is equal to (525/2) times the frequency of the V sync signal. In a preferred embodiment, the H sync signal is 15.75 KHz and the V sync signal is 60 Hz.

The down counter 252 supplies a first synchronized (sync) clock signal to the primary switching regulator 214, that is synchronized with the H sync signal. In particular, the first synchronized clock signal is a multiple of the H sync signal. In a preferred embodiment, the frequency of the first synchronized clock signal is 10 times the frequency of the H sync signal, i.e., 157 KHz. The down counter 252 also supplies a second synchronized (sync) clock signal to the first and second secondary switching regulators 216 and 218, that is synchronized with the H sync signal. In particular, the second synchronized clock signal is also a multiple of the H sync signal. In a preferred embodiment, the frequency of second synchronized clock signal is equal to 15 times the frequency of the H sync signal, i.e., 236 KHz.

FIGS. 4A and 4B are timing diagrams illustrating the timing cycles of a video clock signal and a switching regulator clock signal respectively. For present discussion purposes, the video clock signal is the H sync signal while the switching regulator clock signal may be either the first synchronized clock signal or the second synchronized clock signal. As shown, the video clock signal and the switching regulator clock signal are not synchronized. For example, if the video clock signal has a period of $T_1$ and a frequency of $F_1$ and the switching regulator clock signal has a period of $T_2$ and a frequency of $F_2$, then since $T_1 \approx T_2$, $(1/T_1) \approx (1/T_2)$ and $F_1 - F_2 \approx 0$. As a result, beat frequency noise or distortion due to power conversion by the switching regulators 214, 216 or 218 results in an interference signal that moves relative to the video data provided on the display screen 220 (see FIG. 4C), thus reducing the quality of the displayed image on the display screen 220.

FIGS. 5A and 5B are timing diagrams illustrating the timing cycles of a video clock signal and a switching regulator clock signal respectively. As shown, the video clock signal and the switching regulator clock signal are synchronized. In this case, $T_1 = T_2$; thus $(1/T_1) = (1/T_2)$ and $F_1 - F_2 = 0$. As a result, beat frequency noise or distortion due to power conversion by the switching regulators 214, 216 or 218 results in a static interference signal, i.e., the interference signal is stationary relative to the video data provided on the display screen 220 (see FIG. 5C). This stationary interference signal is virtually undetectable by the human eye.

Through the implementation of the principles of the present invention, beat frequency noise and electric or magnetic field distortion resulting from the switching frequency generated by power supply regulators may be minimized and/or eliminated, thereby increasing the quality and the entertainment value of programs provided by in-flight entertainment system which utilize the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. An apparatus for reducing interference on a display screen in an in-flight entertainment system, the interference resulting from power conversion by a power regulator that supplies voltage to the display screen, comprising:

a clock generator that provides a video clock signal and a regulator clock signal having a frequency that is a multiple of a frequency of the video clock signal;

a video processing circuit coupled to the clock generator that provides video data to the display screen at a rate derived from the video clock signal; and a regulator circuit coupled to the video processing circuit and the clock generator, said regulator circuit supplying voltage to said video processing circuit at a rate based on the regulator clock signal.

2. The apparatus of claim 1, wherein the video processing circuit comprises a video processor and a video converter that is coupled to the video processor.

3. The apparatus of claim 2, wherein said regulator circuit comprises a primary switching regulator, a first secondary switching regulator and a second secondary switching regulator; the display screen and the first and second secondary switching regulators being coupled to receive converted voltage from the primary switching regulator, wherein the first secondary switching regulator provides a first regulated voltage to the video converter and the second secondary switching regulator provides a second regulated voltage to the video processor;

and wherein the clock generator provides a first regulator clock signal to the primary switching regulator and a second regulator clock signal to the first and second secondary switching regulators.

4. The apparatus of claim 3, wherein first regulator clock signal has a first frequency that is a multiple of the video clock signal.

5. The apparatus of claim 4, wherein the second regulator clock signal has a second frequency that is a multiple of the video clock signal.

6. The apparatus of claim 1, wherein the clock generator comprises:

a clock oscillator that generates a clock signal; and a counter coupled to the clock oscillator that generates the video clock signal and the regulator clock signal based on the clock signal.

7. An apparatus for reducing interference on a display screen in an in-flight entertainment system, comprising:

a power supply that provides supply voltage;

a clock generator that provides a video clock signal and a regulator clock signal having a frequency that is a multiple of a frequency of the video clock signal;

a video processing circuit coupled to the clock generator that provides video data to the display screen at a rate derived from the video clock signal;

a regulator circuit coupled to the power supply, the video processing circuit and the clock generator, said regulator circuit supplying regulated voltage to said video processing circuit at a rate based on the regulator clock signal; and the display screen coupled to the video processing circuit that displays the video data.

8. The apparatus of claim 7, wherein the video processing circuit comprises a video processor and a video converter that is coupled to the video processor.

9. The apparatus of claim 8, wherein said regulator circuit comprises a primary switching regulator, a first secondary switching regulator and a second secondary switching regulator; the display screen and the first and second secondary switching regulators being coupled to receive converted voltage from the primary switching regulator, wherein the first secondary switching regulator provides a first regulated voltage to the video converter and the second secondary switching regulator provides a second regulated voltage to the video processor;

and wherein the clock generator provides a first regulator clock signal to the primary switching regulator and a second regulator clock signal to the first and second secondary switching regulators.

10. The apparatus of claim 9, wherein the first regulator clock signal has a first frequency that is a multiple of the video clock signal.

11. The apparatus of claim 10, where in the second regulator clock signal has a second frequency that is a multiple of the video clock signal.

12. The apparatus of claim 7, wherein the clock generator comprises :

a clock oscillator that generates a clock signal; and a counter coupled to the clock oscillator that generates the video clock signal and the regulator clock signal based on the clock signal.

13. A method for reducing interference on a display screen in an in-flight entertainment system, the interference resulting from power conversion by a power regulator that supplies voltage to the display screen, comprising the steps of:

providing a video clock signal;

providing a regulator clock signal having a frequency that is synchronized to a frequency of the video clock signal;

providing a video processing circuit that provides video data to the display screen at a rate derived from the video clock signal; and supplying voltage to said video processing circuit at a rate based on the regulator clock signal.

14. The method of claim 13, wherein the frequency of the regulator clock signal is a multiple of the video clock signal frequency.

15. The method of claim 13, wherein in the step of providing video data, said video processing circuit comprises a video processor and a video converter that is coupled to the video processor.

16. The method of claim 13, wherein in the step of supply voltage, said voltage is provided by a regulator circuit that comprises a primary switching regulator, a first secondary switching regulator and a second secondary switching regulator, wherein the display screen and the first and second secondary switching regulators being coupled to receive converted voltage from the primary switching regulator, wherein the first secondary switching regulator provides a first regulated voltage to a video converter and the second secondary switching regulator provides a second regulated voltage to a video processor;

and wherein the step of providing a regulated clock signal comprises the steps of providing a first regulator clock signal to the primary switching regulator and providing a second regulator clock signal to the first and second secondary switching regulators.

17. The method of claim 16, wherein the first regulator clock signal has a first frequency that is a multiple of the video clock signal.

18. The method of claim 16, wherein the second regulator clock signal has a second frequency that is a multiple of the video clock signal.

19. The method of claim 13, wherein in the steps of providing a video clock signal and a regulator clock signal, the video clock signal and regulator clock signal are provided by a clock generator.

20. The method of claim 19, wherein the clock generator comprises:

a clock oscillator that generates a clock signal; and a counter coupled to the clock oscillator that generates the video clock signal and the regulator clock signal based on the clock signal.

* * * * *